(No Model.) 2 Sheets—Sheet 1.

D. McVAW.
VEHICLE SPRING.

No. 284,649. Patented Sept. 11, 1883.

WITNESSES:
Jas. F. DuHamel,
Walter S. Dodge.

INVENTOR:
Daniel McVaw,
by Dodge Son,
Attys.

(No Model.)  2 Sheets—Sheet 2.

D. McVAW.
VEHICLE SPRING.

No. 284,649. Patented Sept. 11, 1883.

WITNESSES:
Jos. T. DuHamel
Walter S. Dodge.

INVENTOR
Daniel McVaw,
by Dodge & Son,
Attys.

UNITED STATES PATENT OFFICE.

DANIEL McVAW, OF LOUISVILLE, KENTUCKY.

VEHICLE-SPRING.

SPECIFICATION forming part of Letters Patent No. 284,649, dated September 11, 1883.

Application filed June 26, 1883. (No model.)

*To all whom it may concern:*

Be it known that I, DANIEL MCVAW, of Louisville, in the county of Jefferson and State of Kentucky, have invented certain Improvements in Vehicles, of which the following is a specification.

My invention relates to vehicles; and it consists in a novel construction and arrangement of side springs, hereinafter more fully set forth.

Figure 1:
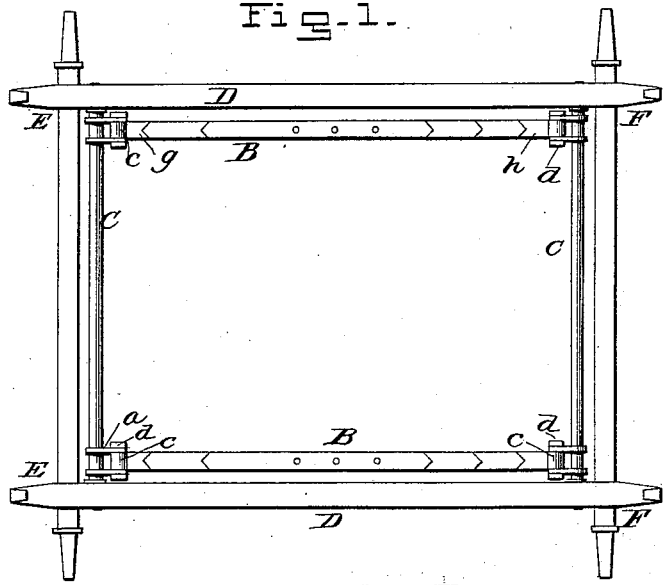
Figure 2:
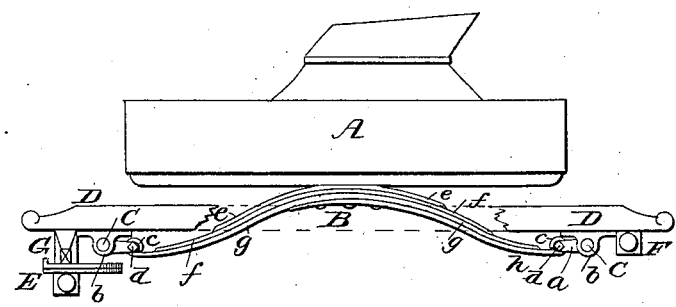
Figure 3:
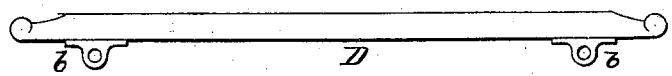
Figure 4:
Figure 5:
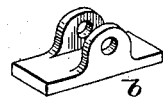
Figure 6:
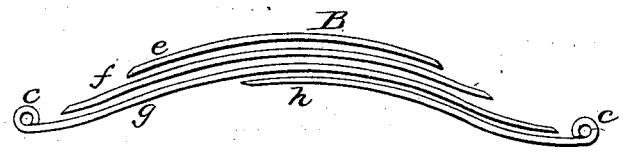

In the accompanying drawings, Figure 1 represents a plan view of the spring-support for the vehicle-body; Fig. 2, a side elevation of the vehicle with the wheels removed; Fig. 3, a side elevation of the side bar; Fig. 4, a plan view of the equalizing-shaft; Fig. 5, a detailed view of the hanger or clip; Fig. 6, an enlarged detail view of the spring.

The purpose of my invention is to provide an easy-riding vehicle using side springs, and to avoid the side rocking or oscillation incident to various constructions hitherto adopted.

To this end the invention consists in supporting the side bars at their rear ends directly upon the rear axle and at their forward ends directly upon the head-block or bolster, and hang the side springs upon rock-shafts carried in bearings applied directly to the side bars, as presently explained; and, further, in forming the springs with an extra leaf extended from about its middle backward, and having formed in its end one of the eyes, the other eye being formed in a separate leaf of the spring.

The object of this construction is to afford greater strength and stiffness to the rear end of the spring, which receives the greater portion of the weight of the load, and is consequently liable to become unduly depressed or broken.

I would here say that I am aware that it is not new to support a vehicle-body upon springs carried by rock-shafts at their ends, extending across the vehicle from side to side and turned in bearings applied directly to the side bars, and, further, that it is not new to make a side spring of greater stiffness at its rear end than at its forward end, and therefore I do not broadly claim these features; but I believe my construction and arrangement of said parts to be new.

Referring again to the drawings, A represents the body of the vehicle; B, the side springs; C, the equalizing-shafts; D, the side bars, and E and F the front and rear supports of said side bars, the former provided with a head-block, G, as usual. The rear support, F, is the rear axle, and the forward support, E, is the bolster supported upon the forward axle, and connected therewith by the ordinary king-bolt and turn-table common to all vehicles of this class.

The equalizing-bars C, which consist, simply, of shafts, provided with cranked portions or crank-arms $a$, are journaled in hangers or bearings $b$, which are preferably bolted to the under side of the side bars, D, the ends of the springs B being formed with eyes $c$, which are carried by bolts $d$, passing through the crank-arms $a$, the arrangement being such that when the vehicle is unloaded the cranked portion shall stand in substantially horizontal position, as indicated in Fig. 2, but upon the application of the load they will swing backward under the elongation of the springs, a weight or load applied to one side of the body causing the spring at that side to be elongated, and thereby causing the rocking or turning of the shafts C at both ends of the vehicle, which rotation or rocking causes a corresponding elongation of the spring at the opposite side, as is well understood. It will be seen, however, that by supporting the side bars directly upon the rear axle and the forward bolster or head-block the side sway or rocking of the body incident to the use of semi-elliptic front and rear springs between the supports E and F and the side bars, D, is entirely overcome, and at the same time the cost of construction is lessened. This change, while apparently simple, is one of great importance in securing an easy-riding and nice-appearing vehicle, in which the body shall always maintain the true horizontal position.

Referring now to Fig. 6, the construction of the spring will be described. Said spring consists of a series of leaves, $e, f, g$, and $h$, two or any higher number being employed, as found desirable. The leaves extend equally on opposite sides of a point at or about the mid-length of the spring, with the exception of the lower leaf, $h$, which extends from a point at or near the mid-length of the spring to the rear end, and is formed with an eye, c, as shown, the the eye c at the opposite end of the spring being formed in the leaf g.

It will be seen that under this construction, the leaves being properly joined together by clips or fastenings, as usual, the rear half of the spring will possess greater strength and stiffness than the forward half, this being necessary for the reason that in side-bar vehicles the weight of the load is thrown more back of the center than forward of the same. It will also be seen that the distance between the eyes at the ends of the spring may be more readily and accurately regulated than where the said eyes are both formed upon the same leaf or section of the spring, and finally that in case of breakage of the spring the plates g and h may be renewed at less expense than where a single plate is used and provided with eyes at both ends.

The springs may be attached directly to the sill of the body and the usual spring bars or blocks be omitted, the spring being made flat on top, so that as it is depressed and straightened out under a load the bearing-face is lengthened and the elastic or active portions of the spring proportionately shortened. This action causes the spring to accurately adjust and adapt itself to the load to be carried, and causes the vehicle to ride with equal ease under heavy and light loads.

Having thus described my invention, what I claim is—

1. In a side-bar vehicle, a spring, B, having a short leaf at its under side, extending from a point at or about the mid-length of the spring back to the rear end of the spring, substantially as and for the purpose explained.

2. In a side spring, the combination of a series of leaves, the bottom leaf extending from about the mid-length of the spring, and formed with an eye, c, the next leaf above extending from the forward end to or nearly to the rear end of the spring, and provided at its forward end with an eye, c, substantially as and for the purpose shown.

3. The herein-described spring, consisting of the leaves e, f, g, and h, said leaves g and h being each provided with an eye, c, and the lower leaf being of less length than those above, substantially as and for the purpose explained.

DANIEL McVAW.

Witnesses:
  J. W. BOOTH,
  I. BRENNER.